United States Patent [19]
Yamano

[11] Patent Number: 5,727,238
[45] Date of Patent: Mar. 10, 1998

[54] AUTOMATIC FOCUS ADJUSTMENT DEVICE

[75] Inventor: Shozo Yamano, Tokyo, Japan

[73] Assignee: Nikon Corporation, Tokyo, Japan

[21] Appl. No.: 754,813

[22] Filed: Nov. 21, 1996

[30] Foreign Application Priority Data

Dec. 7, 1995 [JP] Japan .................................. 7-318819

[51] Int. Cl.$^6$ .................................................. G03B 13/36
[52] U.S. Cl. ............................................. 396/104; 396/128
[58] Field of Search .......................... 396/95, 104, 128, 396/121, 89; 250/201.8, 201.2

[56] References Cited

U.S. PATENT DOCUMENTS

5,061,951  10/1991  Higashihara et al. ................ 396/104
5,469,240  11/1995  Uchiyama et al. .................... 396/104
5,628,036   5/1997  Ozawa et al. ......................... 396/104

*Primary Examiner*—W. B. Perky
*Attorney, Agent, or Firm*—Oliff & Berridge, P.L.C.

[57] ABSTRACT

An automatic focus adjustment device is provided that includes a focus detector that detects focus data of a photographic lens, a storage device that stores the focus data, and a focus adjustment device that performs focus adjustment of the photographic lens, based on the focus data stored in the storage device. The automatic focus adjustment device further includes a selection device that selects whether to store focus data in the storage device based on one of a length of a focus data detection interval in the focus detector; a size of a change in focus data in the focus detector; and reliability data detected by an identification device.

19 Claims, 8 Drawing Sheets

AUTOMATIC FOCUS ADJUSTMENT DEVICE

BACKGROUND OF THE INVENTION

1. Field of the Invention

The invention relates to an automatic focus adjustment device for performing focus adjustment based on data relating to a defocus amount, and other focus states (referred to as "focus data"), and in particular, relates to an automatic focus adjustment device that selects and utilizes significant focus data.

2. Description of the Related Art

Conventionally, an automatic focus adjustment device is installed in cameras and other optical devices in order to automatically perform focus adjustment of optical systems. In these automatic focus adjustment devices, the detection of focus data is performed through the use of commonly known focus detection systems, such as phase contrast detection methods or external light perception methods. The focus data is recorded sequentially in a storage device, such as a memory circuit, and is accumulated collectively as focus data formed from a fixed number of samples.

Focus data, accumulated in this way over a plurality of past points of time, is used in various ways in focus adjustment. For example, based on fluctuations in the focus data, an automatic focus adjustment device identifies whether an object is a moving object. Based on the results of this identification, switching of the focus adjustment mode is performed.

In phase difference detection methods, the luminous flux for focus detection is received through the mirror box, with the result that detection of focus data can not be performed when the mirror is up. The tendency of the focus data accumulated in the storage device is determined from the luminous flux, and the value of the focus data, occurring after the mirror has gone up, is predicted, by extending out the tendency. The focus adjustment of the photographic lens is continued by matching the predicted value so that the focus adjustment does not diverge widely from the changes in the position of the object that occur during exposure, and a good focus state can be obtained.

In automatic focus adjustment devices of recent years, accompanying the trend toward improvements in the processing speed of microprocessors, the time taken in the calculation of focus data has been shortened, and detection intervals for the focus data, that is, the time interval between the detection of focus data, have become considerably shorter. Further, when the luminous flux for focus detection is bright, the time taken for accumulation in focus detection CCDs is shortened such that the interval for detecting focus data is considerably shortened.

Under these circumstances, when the detection interval of the focus data has been shortened, the number of samples of detected focus data per unit time can be increased. By increasing the number of samples of focus data in this way, the tendency of the focus data can be obtained in more detail so that object movement can more accurately be predicted.

However, because the number of samples of focus data increases, storage with greater storage capacity becomes necessary, which was a problem. The increase in the number of samples of focus data also results in an increase in the number of calculations necessary for processing the focus data to determine the tendency of the focus data, so that processing becomes needlessly intricate, which was another problem.

By shortening the detection interval of the focus data, where the storage capacity of the storage has not been increased, the sampled section of the focus data is shortened. As a result, slow time-based change in focus data could not be obtained so that the determination of whether the object is a moving object could not be clearly determined, which was yet another problem.

Also, because of the occurrence of quantum conversion errors, and other detection errors, during the detection of focus data, the detection values of the focus data become fairly dispersed. When calculating the time differential for dispersed focus data, due to the shortened detection interval of the focus data, the error included in time differential becomes large. As a result, in a case in which the predicted value of the focus data is determined by extending out two to three points in time in the tendency of the previous focus data, due to the detection interval of the focus data becoming short, the predicted value becomes widely diverged from the actual focus data, which was a problem.

Figure 10A:
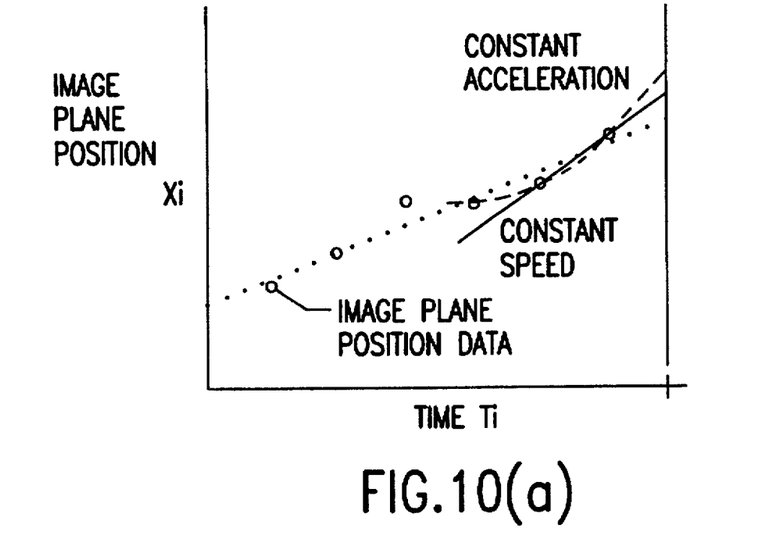
FIGS. 10(a) and 10(b) are graphs that illustrate prediction error due to dispersed focus data.
Figure 10B:
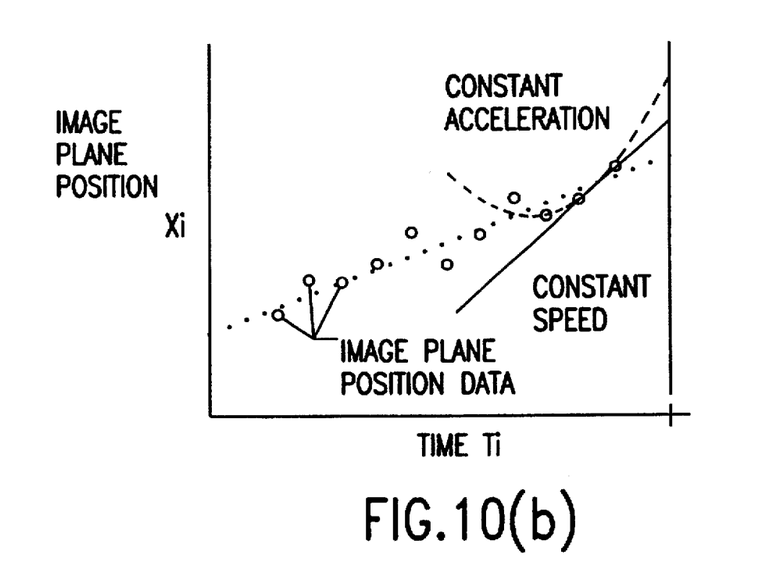

As shown in FIG. 10(a), in the case in which the detection interval of the focus data is long, the straight line (shown as a solid line in the figure), which extends with the fixed image plane velocity, or the curved line (shown as a broken line in the figure), which extends with the fixed image plane acceleration, are positioned in the neighborhood of the central axis (shown in the figure as a dotted line) of the dispersed focus data. However, as shown in FIG. 10(b), in a case in which the detection interval of the focus data is short, both of the aforesaid predictions, the prediction shown by the straight line, and the prediction shown by the curved line, diverge widely from the central axis of the dispersed focus data.

SUMMARY OF THE INVENTION

In order to solve the afore-mentioned problems, the objective of the invention is to provide an automatic focus adjustment device that selects and uses significant focus data for focus adjustment, without needlessly increasing the number of samples of focus data stored in the storage device.

According to a first procedure for providing automatic focus adjustment according to the invention, an automatic focus adjustment device is equipped with a focus detector for detecting focus data of a photographic lens, a storage device for storing the focus data, and a focus adjustment device for adjusting the focus of the photographic lens. The adjustment is based on the focus data stored in the storage device. The automatic focus adjustment device is further equipped with a selection device that selects whether to store focus data in the storage device based on the length of the focus data detection interval in the focus detector. The selection device, after passage of a prescribed time from the moment of detection of focus data stored during the previous time in the storage device, stores the most recent focus data in the storage device.

According to a second procedure for providing automatic focus adjustment according to the invention, an automatic focus adjustment device is equipped with a focus detector for detecting focus data of a photographic lens, a storage device for storing the focus data, and a focus adjustment device for adjusting the focus of the photographic lens. The adjustment is based on the focus data stored in the storage device. The automatic focus adjustment device of the second embodiment is further equipped with a selection device that selects whether to store focus data in the storage device based on the size of the changes in focus data in the focus detector. The selection device of the second procedure compares the most recent focus data to the focus data stored during the previous time in the storage device and, when the most recent focus data fluctuates beyond a fixed value, stores the most recent focus data in the storage device.

According to a third procedure for providing automatic focus adjustment according to the invention, an automatic focus adjustment device is equipped with a focus detector for detecting focus data of a photographic lens, a storage device for storing the focus data, and a focus adjustment device for adjusting the focus of the photographic lens. The adjustment is based on the focus data stored in the storage device. The automatic focus adjustment device of the third embodiment is further equipped with an identification device for detecting reliability data denoting the reliability of the focus detection, and a selection device that selects whether to store focus data in the storage device based on the reliability data detected by the identification device.

The selection device of the third procedure compares the most recent reliability data to the reliability data obtained from the focus data stored in the storage device during the previous time and, when the most recent reliability data fluctuates beyond an acceptable value, stores the most recent focus data in the storage device. The identification device detects one or more of brightness, contrast, and spatial frequency, concerning the object image formed through the photographic lens, and defines that detected value, or values, as the reliability data.

In the automatic focus adjustment device employing the first procedure, the selection device, based on the length of the focus data detection interval in the focus detector selects whether to store focus data in the storage device. Generally, when the focus data detection interval is short, the values of the continuously detected focus data are close to each other. Because the values are similar to each other, the focus data itself has low significance for obtaining the tendency of the focus information. The selection device selects focus data based on the length of the focus data detection interval. As a result, the focus data that is of low significance is left out, and the focus data of high significance is stored in the storage device.

Further, the selection device, after a prescribed length of time has passed from the moment of detection of the focus data recorded during the previous time in the storage device, stores the most recent focus data in the storage device. Accordingly, the detection interval of the focus data stored in the storage device becomes longer than the prescribed length of time so that extraneous focus data of low significance having a short detection interval is eliminated.

In the automatic focus adjustment device employing the second procedure, the selection device, based on the change in focus data in the focus detector, selects whether to store focus data in the storage device. Generally, in the case where an object moves at a slow velocity, the focus data values, such as the image plane position, change slowly. The focus data are similar to each other, and have low significance for obtaining the tendency of the focus data. The selection device of the second procedure selects focus data based on the size of the change in focus data so that points of focus data having low significance are left out, and points of focus data having high significance are stored in the storage device.

Further, the selection device of the second procedure compares the most recent focus data to data recorded during the previous time in the storage device and, when the most recent focus data has changed beyond a prescribed value, stores the most recent focus data in the storage device. Accordingly, when the values of focus data stored in the storage device differ from each other beyond a prescribed value, extraneous focus data of low significance having similar data values are left out.

In the automatic focus adjustment device employing the third procedure, the identification device detects the reliability data. The reliability data is formed of values representing the reliability of focus detection, and have values almost identical for a particular object. Accordingly, based on the values of the reliability data, it can be identified whether the object for which focus detection is being executed is the same as before. The selection device of the third procedure selects whether to store the focus data in the storage device based on the reliability data. Generally, there are few cases in which, when focus detection is being performed on an identical object, the value of the focus data changes discontinuously. Usually the focus data changes smoothly. By interpolating both ends of the focus data, interim points of the focus data can be easily estimated. Accordingly, the points of focus data become focus data of low significance for obtaining the tendency of the focus data. However, since the selection device performs the selection of focus data, based on the above-explained reliability data which for each object performs the selection of focus data, focus data of low significance, relating to identical objects, is left out, and focus data of high significance is stored in the storage device.

Further, the selection device of the third procedure compares the most recent reliability data to the reliability data from the time that the focus data was recorded during the previous time in the storage device, and, when the most recent reliability data has changed beyond the acceptable value, stores the most recent focus data in the storage device. Since, for each of the reliability data that has changed beyond an acceptable value, the focus data is stored in the storage device and focus data of low significance, relating to identical objects, is left out.

Also, the identification device detects one or more of brightness, contrast, and spatial frequency, regarding the object image formed through the photographic lens. Because the values affect the focus detection reliability, and change for each object, the values can be employed as reliability data.

Accordingly, as explained above, in the automatic focusing device employing the first procedure because the focus data is selected based on the length of the detection interval of focus data, the focus data with low significance and a short detection interval is thinned out, and only focus data with high significance is stored in the storage device. Thus, without increasing the number of samples of focus data stored in the storage device, the storage capacity of the storage device is efficiently reduced.

Further, since the number of samples of focus data is reduced, the amount of processing during processing of the focus data, is efficiently reduced. Furthermore, the time intervals between the stored focus data are set so that the sampled section of focus data becomes long, and slower time fluctuations of focus data can be clearly grasped. Accordingly, even with an object moving at a low velocity whether the object is truly moving can be clearly determined.

Also, the time intervals between the stored focus data are set so that when the time differential is calculated for focus data, which are dispersed, the error included in the time differential is kept small. As a result, in a case when the prediction value of the focus data is determined as extending out two or three points in time in the tendency of the focus data, imprecision in the prediction value is kept small.

Additionally, after the passage of a prescribed length of time from the moment of detection of the focus data stored during the previous time in the storage device, the most recent focus data is stored in storage device. Accordingly, the time intervals between the focus data stored in the storage device are set beyond the prescribed length of time, so that focus data of low significance and a short detection interval can be easily removed.

In the automatic focus adjustment device using the second procedure, because the focus data is selected based on the size of the change in focus data, the focus data values matching focus data of low significance are thinned out, and only the focus data of high significance is stored in the storage device. Thus, without increasing the number of samples of focus data stored in the storage device, the storage capacity of the storage device is efficiently reduced.

Further, since the number of samples of focus data is reduced, the amount of processing, during processing of focus data, is efficiently reduced. Furthermore, the time intervals of the stored focus data are set with regard to objects moving at a low velocity, so that the sampled section of focus data is lengthened, and slower time fluctuations of focus data can be clearly grasped. Accordingly, even with objects moving at a low velocity, it can be clearly determined whether the object is moving.

Also, for objects moving at a low velocity, the time intervals between stored focus data are set so that when the time differential for focus data, which are dispersed, is calculated, the time differential inclusive of error is kept low. Thus, in a case when the prediction value of the focus data is determined by extending out two or three previous points in time in the tendency of the focus data, imprecision in the prediction value is controlled to be small. Additionally, the value of the focus data stored in the storage device is set at a prescribed value so that values matching focus data of low significance can be easily removed.

In the automatic focus adjustment device employing the third procedure, since the focus data is selected to be stored in the storage device based on the reliability data, focus data of low significance, relating to identical objects, is thinned out. Thus, without increasing the number of samples of focus data stored in the storage device, the storage capacity of the storage device is efficiently reduced.

Further, the number of samples of focus data is reduced, so that the amount of processing during processing of focus data is efficiently reduced. Furthermore, focus data relating to new objects is accurately selected without being thinned out, so that response in focus adjustment of new objects is not lacking.

Also, the time intervals between stored focus data, with regard to identical objects, is set so that the sampled section of focus data is lengthened, and slower time fluctuations in focus data can be clearly grasped. Accordingly, even for objects moving at a low velocity, it can be clearly determined whether the object is moving.

Further, for identical objects, the time intervals between the stored focus data is set so that when the time differential is calculated for dispersed focus data, the error included in the time differential is controlled to be small. Thus, in a case when the prediction value of the focus data is determined as extending out two or three previous points of time in the tendency of the focus data, imprecision in the prediction value is kept small.

Additionally, because the focus data is stored in the storage device, only in a case in which the reliability data has deviated beyond an acceptable value, focus data of low significance, relating to identical objects, is left out. Also, values of object image brightness, contrast, or spatial frequency, can be used as reliability data. These values, along with other values representing the reliability of focus detection, are values which can easily identify the object. Accordingly, based on this type of reliability data, the determination as to whether the focus data relates to an identical object, can be clearly made, and focus data of low significance, relating to identical objects, is appropriately left out.

As explained above, with the automatic focus adjustment device of the invention, the focus data significant for focus adjustment can be efficiently and easily selected without increasing the number of samples of the focus data stored in the storage device. Accordingly, focus adjustment can be appropriately performed, based only on significant focus data.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF THE PREFERRED EMBODIMENTS

Figure 1:
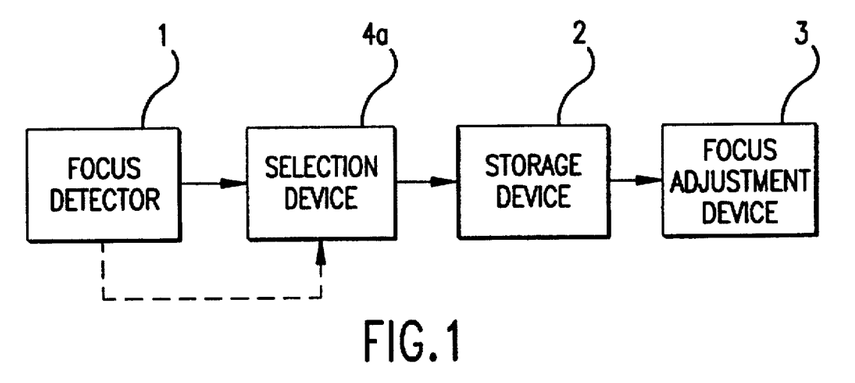
FIG. 1 is a block diagram that illustrates a first procedure for providing automatic focus adjustment according to the invention.

FIG. 1 is a block diagram that illustrates the first procedure for providing automatic focus adjustment according to the invention. According to the first procedure, an automatic focus adjustment device is equipped with a focus detector 1 for detecting the focus data of a photographic lens, a storage device 2 for storing the focus data, and a focus adjustment device 3 for adjusting the focus of the photographic lens. The adjustment is based on the focus data stored in storage device 2. The automatic focus adjustment device is further equipped with a selection device 4a that selects whether to store focus data in storage device 2 based on the length of the focus data detection interval in focus detector 1. The selection device 4a, after passage of a prescribed time from the moment of detection of focus data stored during the previous time in storage device 2, stores the most recent focus data in storage device 2.

Figure 2:
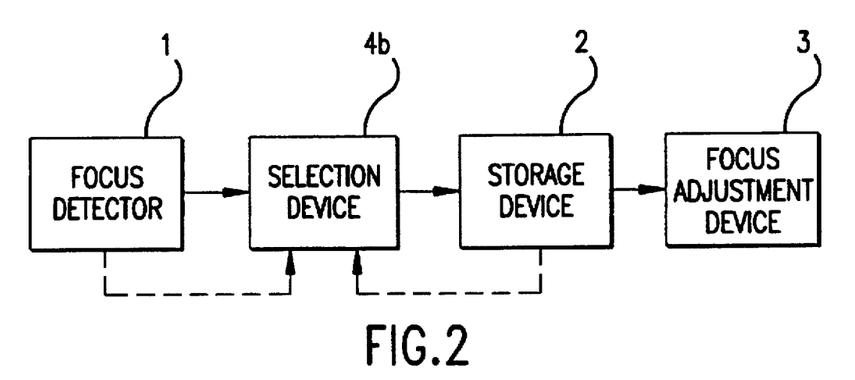
FIG. 2 is a block diagram that illustrates a second procedure for providing automatic focus adjustment according to the invention.

FIG. 2 is a block diagram that illustrates the second procedure for providing automatic focus adjustment according to the invention. According to the second procedure, an automatic focus adjustment device is equipped with a focus detector 1 for detecting focus data of a photographic lens, a storage device 2 for storing the focus data, and a focus adjustment device 3 for adjusting the focus of the photographic lens. The adjustment is based on the focus data stored in storage device 2. The automatic focus adjustment device of the second embodiment is further equipped with a selection device 4b for selecting whether to store focus data in storage device 2 based on the size of the changes in focus data in focus detector 1. The selection device 4b compares the most recent focus data to the focus data stored during the previous time in storage device 2 and, when the most recent focus data fluctuates beyond a fixed value, stores the most recent focus data in storage device 2.

Figure 3:
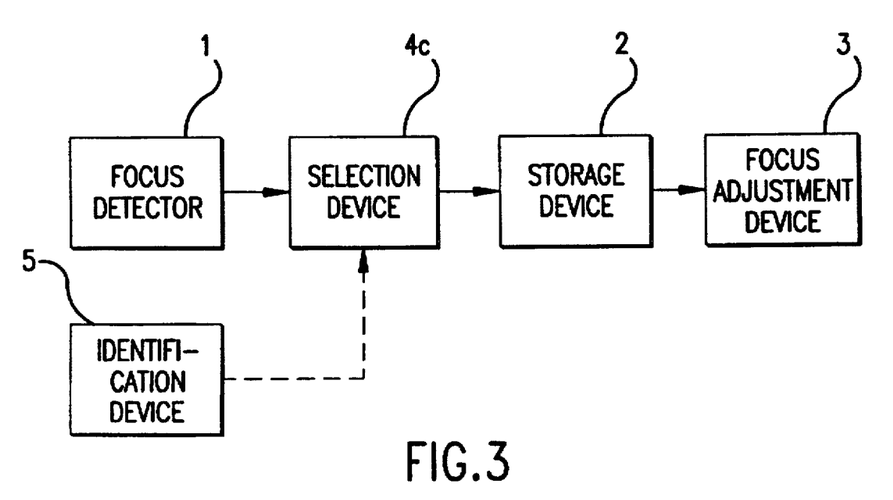
FIG. 3 is a block diagram that illustrates a third procedure for providing automatic focus adjustment according to the invention.

FIG. 3 is a block diagram that illustrates the third procedure for providing automatic focus according to the invention. According to the third procedure, an automatic focus adjustment device is equipped with a focus detector 1 for detecting focus data of a photographic lens, a storage device 2 for storing the focus data, and a focus adjustment device 3 for adjusting the focus of the photographic lens. The adjustment is based on the focus data stored in storage device 2. The automatic focus adjustment device is further equipped with an identification device 5 for detecting reliability data denoting the reliability of the focus detection, and a selection device 4c that selects whether to store focus data in storage device 2, based on the reliability data detected by identification device 5. The selection device 4c compares the most recent reliability data to the reliability data obtained from the focus data stored in storage device 2 during the previous time and, when the most recent reliability data fluctuates beyond an acceptable value, stores the most recent focus data in storage device 2. The identification device 5 detects at least one of brightness, contrast, or spatial frequency, with regard to the object image formed through the photographic lens, and defines that detected value as the reliability data.

Figure 4:
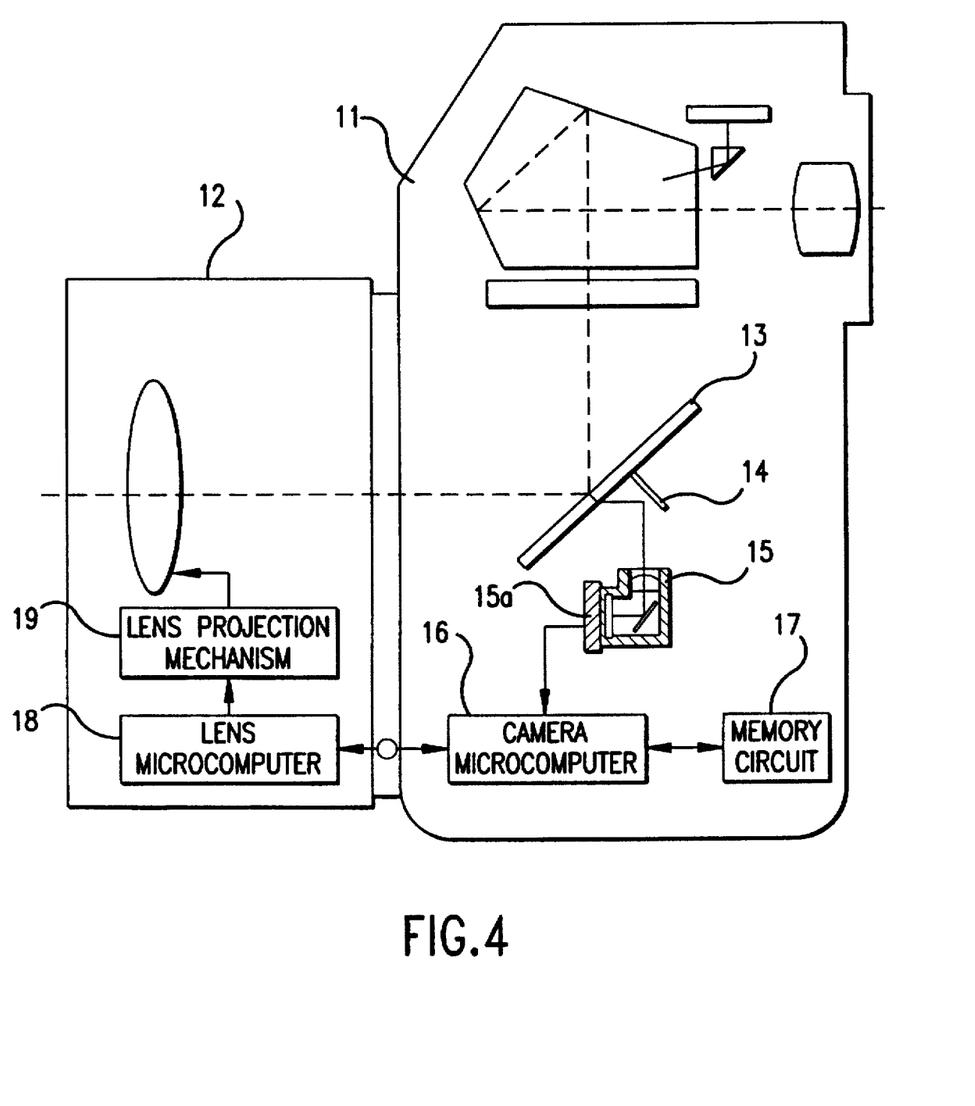
FIG. 4 is a schematic side view of a camera and lens system in which a preferred embodiment of the invention applying the three procedures of FIGS. 1–3 is employed.

FIG. 4 is a schematic side view of a camera and lens system in which a preferred embodiment of the invention applying the three procedures of FIGS. 1–3 are employed. In FIG. 4, a photographic lens 12 is attached to a camera main body 11, and a mirror box formed of a quick return mirror 13 and a submirror 14 is arranged on the optical axis of the photographic lens 12. A focus detector 15 is arranged below the submirror 14, and a focus detection CCD 15a is located within the focus detector 15. The output of the focus detector 15a is transmitted to a camera microcomputer 16.

A memory circuit 17 is connected to the camera microcomputer 16, and the terminal of the camera microcomputer 16 is connected to the lens microcomputer 18 in the photographic lens 12 via the lens mount. The output of the lens microcomputer 18 is connected to the lens projection mechanism 19, which performs the extension of the photographic lens 12.

The focus detector 1 of the first procedure corresponds to the focus calculation functions in the submirror 14, the focus detector 15, the focus detection CCD 15a, and the camera microcomputer 16. The storage device 2 of the first embodiment corresponds to the memory circuit 17 while the focus adjustment device 3 corresponds to lens microcomputer 18 and lens projection mechanism 19. The selection device 4a of the first embodiment corresponds to the storage (memory) determination function in camera microcomputer 16.

With regard to the second procedure, the focus detector 1 corresponds to the focus calculation function in the submirror 14, the focus detector 15, the focus detection CCD 15a, and the camera microcomputer 16; the storage device 2 corresponds to the memory circuit 17; the focus adjustment device 3 corresponds to lens microcomputer 18 and the lens projection mechanism 19; and the selection device 4b corresponds to the storage (memory) determination function in the camera microcomputer 16.

With regard to the third procedure, the focus detection device 1 corresponds to the focus calculation functions in the submirror 14, the focus detector 15, the focus detection CCD 15a, and the camera microcomputer 16; the storage device 2 corresponds to memory circuit 17; the focus adjustment device 3 corresponds to the lens microcomputer 18 and the lens projection mechanism 19; and the selection device 4c corresponds to the storage (memory) determination function in camera microcomputer 16.

Figure 5:
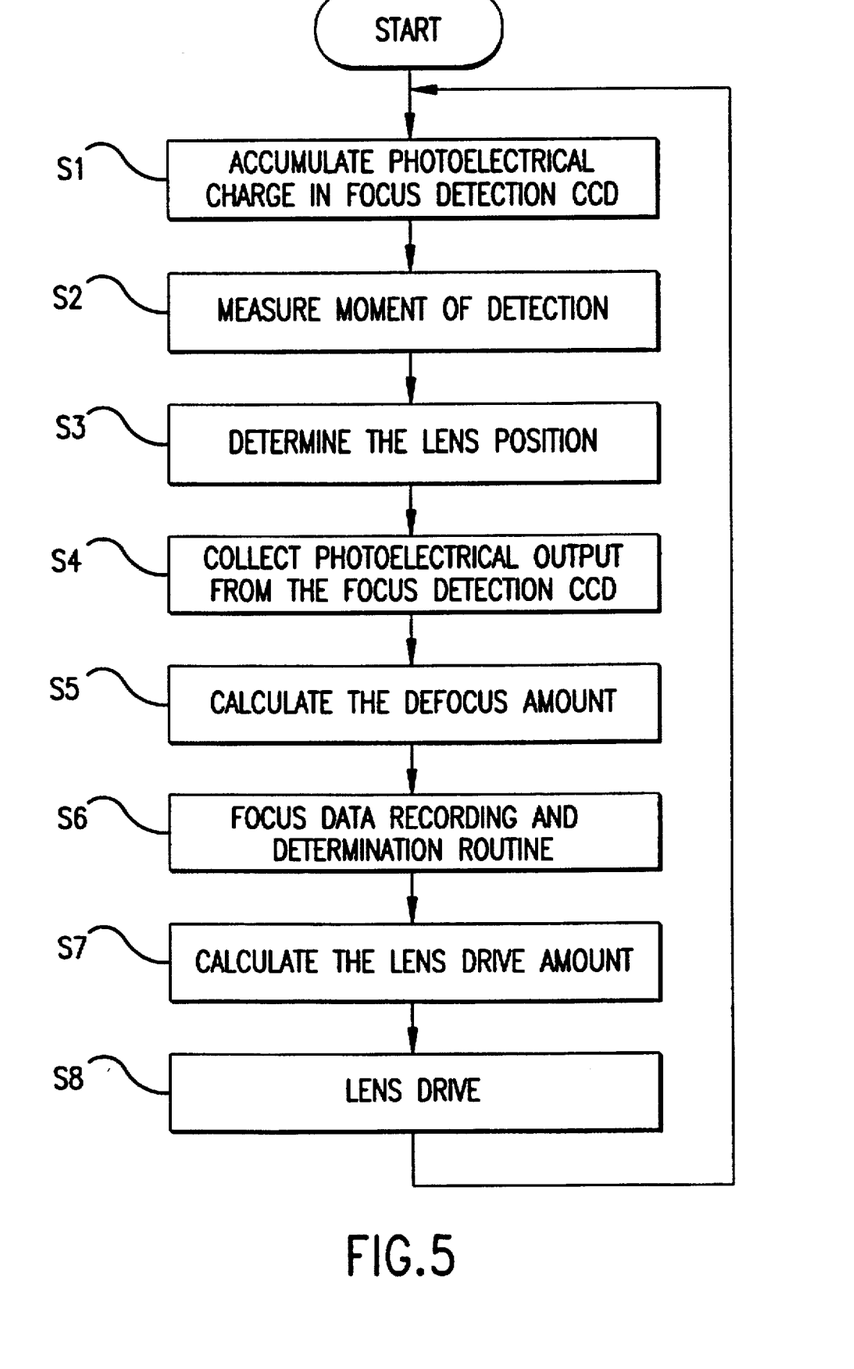
FIG. 5 is a flow chart of the main routine of the automatic focus adjustment device according to the preferred embodiment of the invention.
Figure 6:
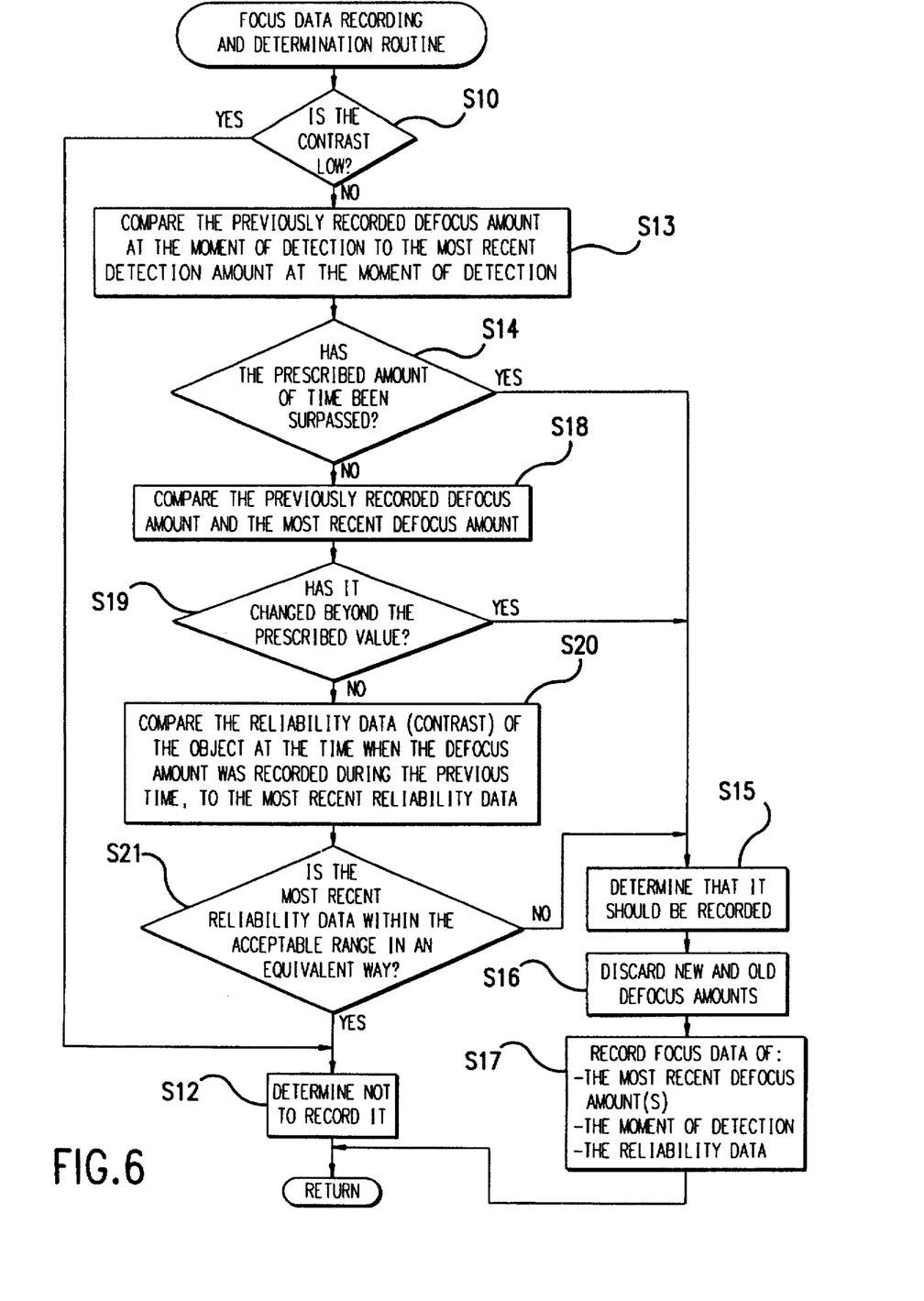
FIG. 6 is a flow chart of the focus data recording and determination routine of the preferred embodiment of the invention.

FIG. 5 is a flow chart of the main routine of the automatic focus adjustment device according to the preferred embodiment of the invention and FIG. 6 is a flow chart of the recording and determination routine for the focus data of the preferred embodiment of the invention. The operation of the automatic focus adjustment device is explained below.

The luminous flux passing through the photographic lens 12, after being reflected to the submirror 14 and first forming an image at the image formation position, enters the focus detector 15. Within the focus detector 15, the luminous flux is divided into two paths of luminous flux, appearing as if divided by the optical axis, and the photorecepting surfaces of the focus detection CCD 15a are respectively illuminated.

Next, the focus detection CCD 15a initiates the accumulation of photoelectrical charges regarding the two divided paths of luminous flux (Step S1), and measures the actual time or moment (counts the time) of detection as the detection time (Step S2). Then, the camera microcomputer 16 communicates with the lens microcomputer 18, and collects the lens position of photographic lens 12 (Step S3).

Figure 7:
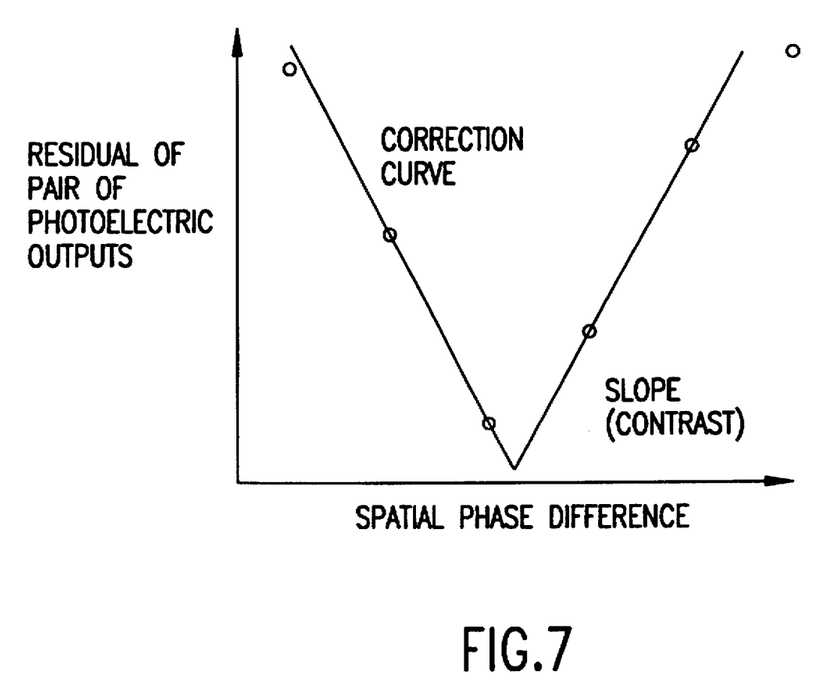
FIG. 7 is a graph that shows the paired correlation detection of the photoelectric output.

Next, the photoelectrical output from the focus detection CCD 15a is collected for each of the two divided paths of luminous flux (Step S4) and the camera microcomputer 16, with regard to the pair of photoelectric outputs, determines a commonly known correlation curve, as shown in FIG. 7. The correlation curve is used in correlated detection of the spatial phase contrast and to calculate the defocus amount (Step S5). Using this information, the camera microcomputer 16 executes the later-explained focus data recording and determination routine (Step S6).

The camera microcomputer 16, based on the focus data accumulated in the memory circuit 17, performs the prediction calculation of the focus data and calculates the target drive position for the photographic lens 12 (Step S7). The lens microcomputer 18 collects the target drive position, drives lens projection mechanism 19, and moves photographic lens 12 to the target drive position (Step S8).

The automatic adjustment of the focus is performed in accordance with the main routine discussed above. Next, the focus data recording and determination routine (step S6 of the main routine) will be explained.

First, the camera microcomputer 16, with regard to the correlation curve (in FIG. 7) determined at the time the defocus amount above (before) is calculated, determines the slope of the correlation curve. The slope, which represents the value of the object image contrast, is reliability data representing the reliability of the defocus amount.

When the reliability data is lower than the predetermined threshold, the object image contrast is extremely low. In this case, the camera microcomputer 16 determines that the reliability of the detection value of the defocus amount is low and, thus, it is inappropriate for use in focus adjustment (Step S10). From that, the camera microcomputer 16, without recording the defocus amount (Step S12), terminates the recording and determination routine. When the reliability data is higher than the threshold value, the detection time of the defocus amount previously recorded in memory circuit 17, and the detection time of the most recent defocus amount, are compared (Step S13).

When the detection times deviate beyond the prescribed amount of time (Step S14), a determination is made by camera microcomputer 16 that they are of significant value with regard to the most recent defocus amount (Step S15). Then, the camera microcomputer 16 discards the oldest data from memory circuit 17 (Step S16). Next, after recording in the memory circuit 17 the focus data formed of the most recent defocus amount, the detection time and the reliability data (Step S17), the camera microcomputer 16 completes the recording and determination routine. When the difference between the detection times is less than the prescribed time, the camera microcomputer 16 compares the previously recorded defocus amount in the memory circuit 17 with the most recent defocus amount (Step S18).

When the defocus amounts deviate beyond the prescribed value (Step S19), the camera microcomputer 16 determines a significant value in regard to the most recent defocus amount. Then, the camera microcomputer 16 discards the oldest data from within the memory circuit 17 (Step S16). Next, it records in memory circuit 17 focus data formed of the most recent defocus amount, the moment of detection (detection time), and the reliability data (Step S17), and terminates the recording and determination routine.

When the difference between the defocus amounts is less than the prescribed value, the camera microcomputer 16 compares the reliability data at the moment during which the defocus amount was recorded during the previous time in the memory circuit 17, with the most recent reliability data (Step S20).

In a case in which the points of reliability data match the acceptable range (Step S21), the camera microcomputer 16 determines that the most recent defocus amount is the focus data relating to the new object, and thus is a significant value. The camera microcomputer 16 then discards the oldest data from within the memory circuit 17 (Step S16). Next, the camera microcomputer 16 records in the memory circuit 17 the focus data formed of the most recent defocus amount, the moment of detection, and the reliability data (Step S17), and then terminates the memory and determination routine. In a case in which the reliability data agree with the acceptable range, the camera microcomputer 16 determines a value with low significance for the most recent defocus amount (Step S12). From that, the camera microcomputer 16 does not record the defocus amount (Step S12), and terminates the memory and determination routine.

Due to the above-explained operation, in the preferred embodiment of the automatic focus adjustment device, when the most recent defocus amount satisfies all of the following three conditions, a determination is made that the most recent defocus amount has a low value of significance:

(1) The prescribed time has not yet been passed from the moment of detection of the defocus amount, that was stored during the previous time.

(2) There is no change beyond the prescribed value, from the moment of detection of the defocus amount, stored during the previous time.

(3) The most recent reliability data and the reliability data from the time at which the defocus amount was previously stored match, within the acceptable range.

In a case in which all of the three above conditions are satisfied, the defocus amounts are determined to have an extremely low significance, and are thinned out in order. On the other hand, the significant defocus amounts, those other than the above defocus amounts, are selected and stored in the memory circuit 17.

Thus, the number of samples of the focus data stored in the memory circuit 17 is not needlessly increased, and the storage capacity of the memory circuit 17 can be efficiently decreased. Moreover, as a result of the ability to decrease the number of samples of focus data, the amount of processing during the processing of focus data can be markedly reduced.

Further, as a result of the time intervals for stored focus data having been spaced appropriately, the sampled section of focus data is lengthened, and slow time-based changes in the focus data can be clearly grasped. Accordingly, even with regard to an object moving at a low velocity, it can be clearly determined whether the object is moving.

Moreover, as a result of the appropriate spacing of the time intervals between the stored focus data, in a case in which the time differential is calculated for the focus data, which is scattered, the error occurring in the time differential is controlled to be small.

Figure 8:
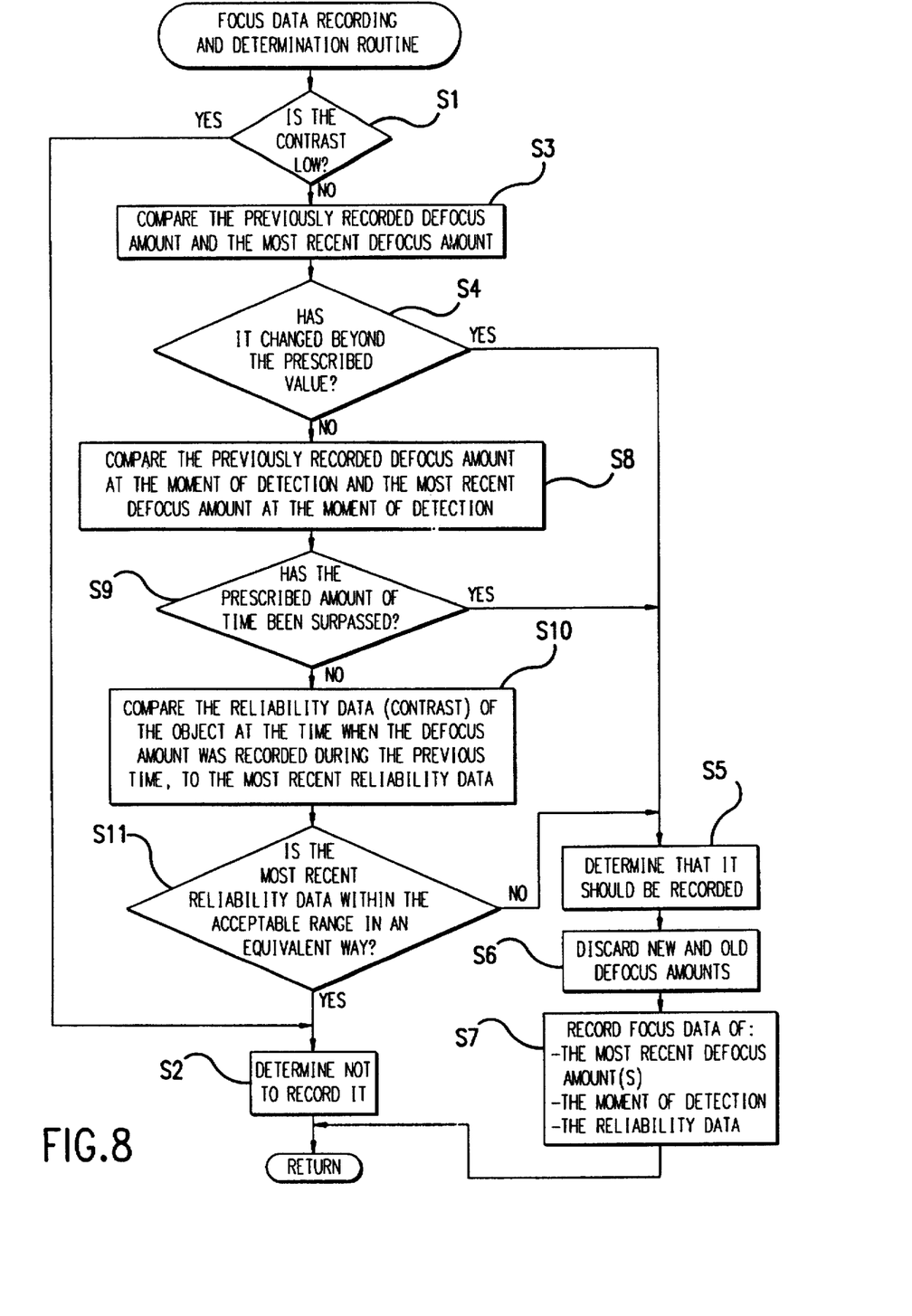
FIG. 8 is a flow chart that illustrates the operation of a first alternative recording and determination routine.

As a result, in a case in which the prediction value of the focus data is determined by extending out two to three points in time in the tendency of the focus data, imprecision in the prediction value becomes small. Also, in the aforesaid preferred embodiment, the significance of the defocus amount is determined in the order shown in FIG. 6. However, the invention is not limited to this order of determination, for example, as denoted in FIG. 8, the order of determination may be switched.

Further, there is no need to perform the determinations successively, for example, in each of the three conditions, the membership function denoting the degree of significance is preset, and based on each output value of the membership functions, the degree of significance may be generally estimated. Because the significance of the focus data can be easily and directly estimated due to this type of structure, the significant focus data can be more appropriately selected.

Figure 9:
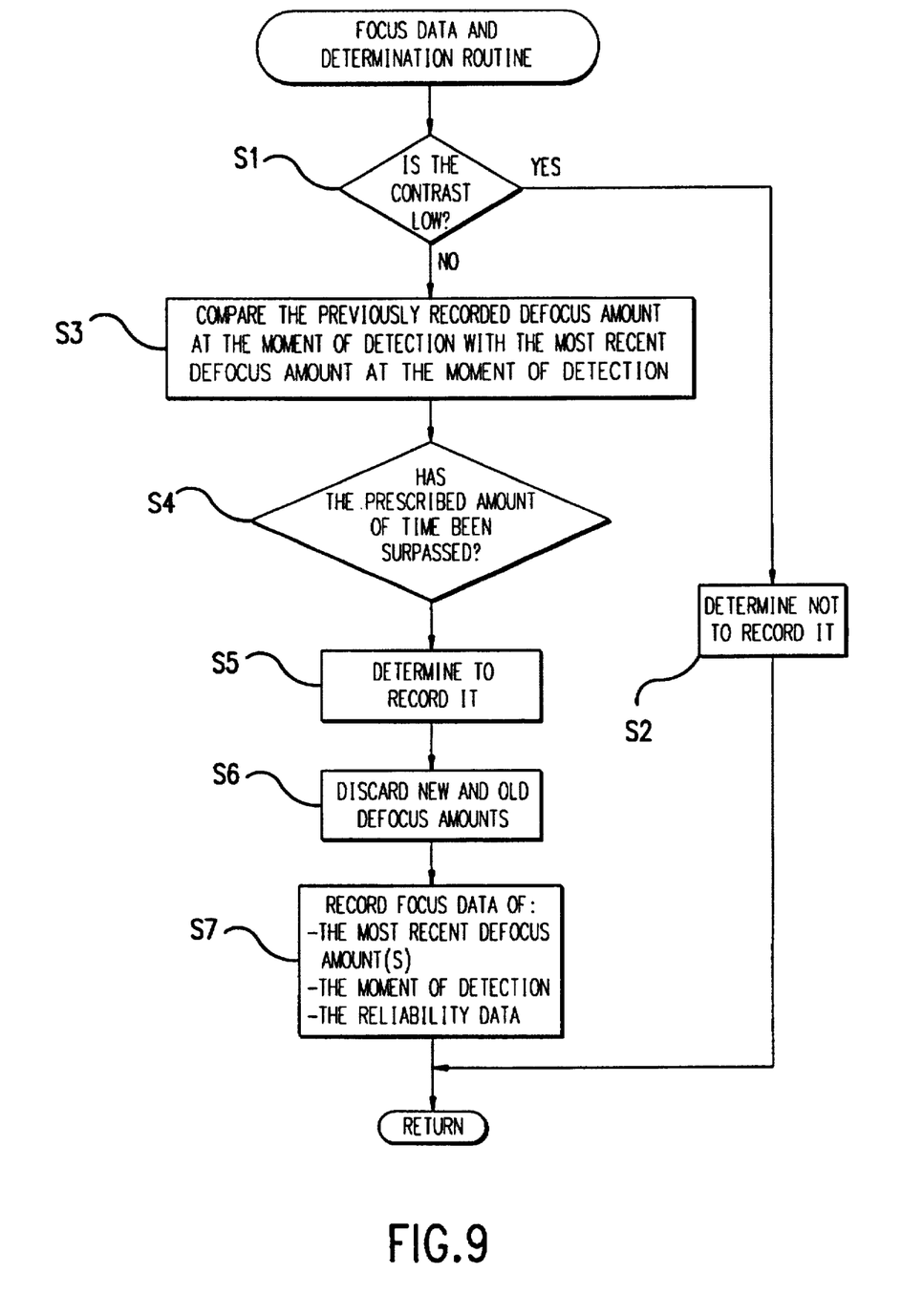
FIG. 9 is a flow chart that illustrates the operation of a second alternative recording and determination routine.

Moreover, in the above-explained preferred embodiment, the significance of the defocus amount can be determined with a combination of the three conditions. However, the invention is not limited to this combination, for example, as denoted in FIG. 9, combining one or two of the three conditions also allows determination of the significance of the defocus amount.

Further, in the above-explained preferred embodiment, the significance is determined with regard to the defocus amount; however, the defocus amount is not limited to being utilized as focus data. Generally, significance is determined for image plane position, image plane velocity, or other focus data, and these points of focus data may be selected.

Furthermore, in the above-explained preferred embodiment, the slope of the correlation curve may be used as the reliability data, however, the invention is not limited to this reliability data. For example, object brightness or object image spatial frequency may be used as reliability data.

While the invention has been described in conjunction with specific embodiments thereof, it is evident that many alternatives, modifications and variations may be apparent to those skilled in the art. Accordingly, the preferred embodiments of the invention a set forth herein are intended to be illustrative, not limiting. Various changes may be made without departing from the spirit and scope of the invention as defined in the following claims.

What is claimed is:

1. An automatic focus adjustment device, comprising:

focus detection means for detecting focus data of a photographic lens;

selecting means for selecting whether to store the focus data based on at least one of a length of a focus data detection interval in said focus detection means, a size of change in focus data in said focus detection means, and reliability data detected by an identification means for detecting reliability data indicating a reliability of the focus detection;

storage means for storing selected focus data effective for automatic focus adjustment; and focus adjustment means for performing focus adjustment of said photographic lens based on the focus data stored in said storage means.

2. The automatic focus adjustment device of claim 1, wherein said selecting means selects whether to store the focus data in said storage means based on a length of a focus data detection interval in said focus detection means.

3. The automatic focus adjustment device of claim 2, wherein said selecting means stores a most recent focus data in said storage means, after passage of a fixed length of time from a moment of detection of focus data previously stored in said storage means.

4. The automatic focus adjustment device of claim 1, wherein said selecting means selects whether to store the focus data in said storage means based on a size of a change in focus data in said focus detection means.

5. The automatic focus adjustment device of claim 4, wherein said selecting means, when a most recent focus data fluctuates beyond a fixed value determined from focus data previously stored in said storage means, compels the most recent focus data to be stored in said storage means.

6. The automatic focus adjustment device of claim 1, wherein said selecting means selects whether to store the focus data in said storage means based on reliability data detected by said identification means for detecting reliability data indicating a reliability of the focus detection.

7. The automatic focus adjustment device of claim 6, wherein, when a most recent reliability data, as compared to reliability data at the time focus data previously stored in said storage means, has fluctuated beyond a predetermined value, the selection means stores the most recent focus data in said storage means.

8. The automatic focus adjustment device of claim 6, wherein said identification means detects at least one of characteristics of brightness, contrast and spatial frequency, with regard to an object image formed through said photographic lens, and defines the detected characteristic as reliability data.

9. The automatic focus adjustment device of claim 7, wherein said identification means detects at least one of characteristics of brightness, contrast and spatial frequency, with regard to an object image formed through said photographic lens, and defines the detected characteristic as reliability data.

10. An automatic focus adjustment device comprising:

a focus detector that detects focus data of a photographic lens;

a selecting device that selects whether to store the focus data based on at least one of a length of a focus data detection interval in said focus detector, a size of a change in focus data in said focus detector, and reliability data detected by an identification device that detects reliability data indicating a reliability of the focus detection;

a memory that stores selected focus data effective for automatic focus adjustment; and a focus adjustment device that performs focus adjustment of said photographic lens, based on the selected focus data stored in said memory.

11. The automatic focus adjustment device of claim 10, wherein said selecting device selects whether to store the focus data in said memory based on a length of a focus data detection interval in said focus detector.

12. The automatic focus adjustment device of claim 11, wherein said selecting device stores a most recent focus data in said memory, after passage of a fixed length of time from a moment of detection of focus data previously stored in said memory.

13. The automatic focus adjustment device of claim 10, wherein said selecting device selects whether to store the focus data in said memory based on a size of a change in focus data in said focus detector.

14. The automatic focus adjustment device of claim 13, wherein said selecting device, when a most recent focus data fluctuates beyond a fixed value determined from focus data previously stored in said memory, compels the most recent focus data to be stored in said memory.

15. The automatic focus adjustment device of claim 10, wherein said selecting device selects whether to store the focus data in said memory based on reliability data detected by said identification means that detects reliability data indicating a reliability of the focus detection.

16. The automatic focus adjustment device of claim 15, wherein, when a most recent reliability data, as compared to reliability data at the time focus data was previously stored in said memory, has fluctuated beyond a predetermined value, said selecting device stores the most recent focus data in said memory.

17. The automatic focus adjustment device of claim 15, wherein said identification device detects at least one of characteristics of brightness, contrast and spatial frequency, with regard to an object image formed through said photographic lens, and defines the detected characteristic as reliability data.

18. The automatic focus adjustment device of claim 16, wherein said identification device detects at least one of characteristics of brightness, contrast and spatial frequency, with regard to an object image formed through said photographic lens, and defines the detected characteristic as reliability data.

19. A method for automatic focus adjustment comprising:

detecting focus data of a photographic lens using a focus detector;

selecting whether to store the focus data in a memory based on at least one of a length of a focus data detection interval in the focus detector a size of a change in focus data in the focus detector and reliability data detected by an identification device that detects reliability data indicating a reliability of the focus detection;

storing selected focus data in the memory; and performing focus adjustment of the photographic lens, based on the selected focus data stored in the memory.

* * * * *